Dec. 1, 1931.    J. T. WOOD    1,834,667
PLOW ATTACHMENT FOR TRACTORS
Filed Dec. 11, 1930    2 Sheets-Sheet 1

Inventor
Joseph T. Wood

By *Clarence A. O'Brien*
Attorney

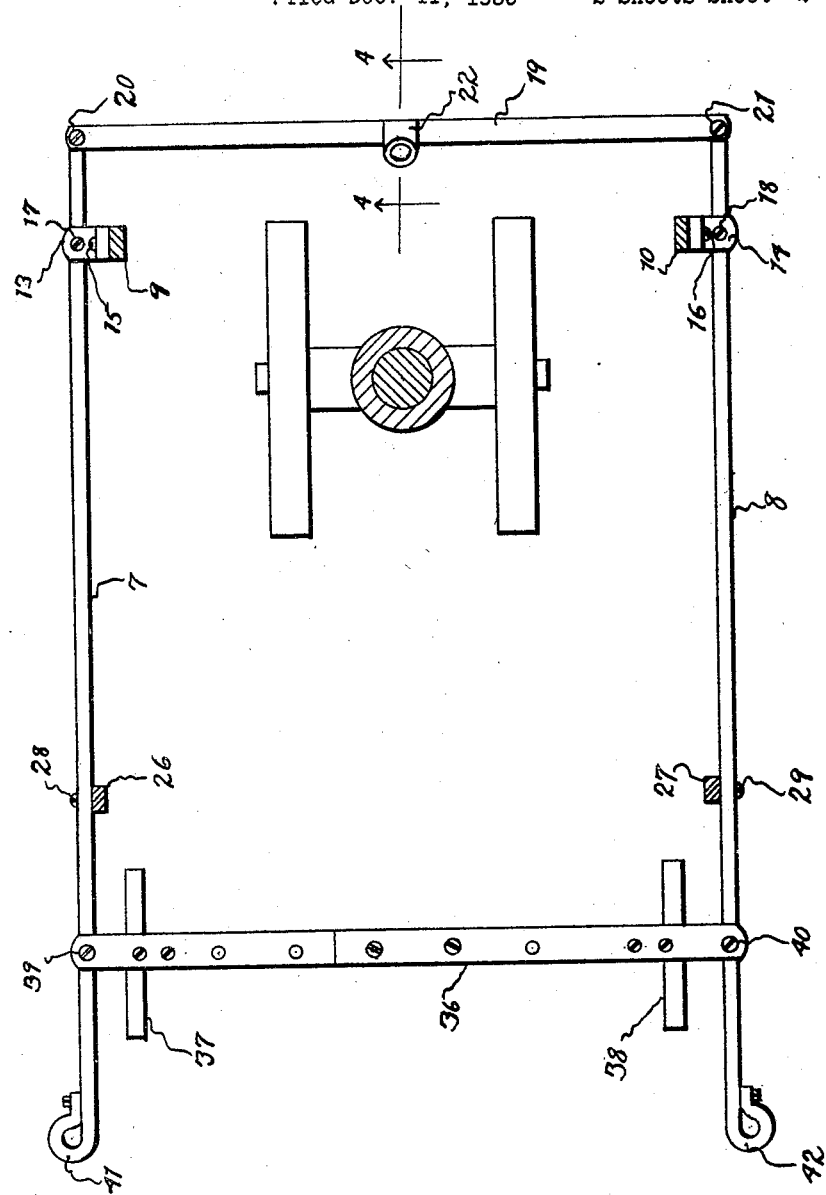

Patented Dec. 1, 1931

1,834,667

UNITED STATES PATENT OFFICE

JOSEPH THOMAS WOOD, OF LEVELLAND, TEXAS

PLOW ATTACHMENT FOR TRACTORS

Application filed December 11, 1930. Serial No. 501,636.

This invention relates generally to plow attachments for tractors whereby the operation of plowing a single row or a plurality of rows is accomplished with a new facility and accurateness not heretofore achieved.

It is the main object of this invention to provide an attachment of the type alluded to which shall permit the entire attention of the operator of the tractor to be directed to guiding the tractor in the operation of plowing.

It is well known that in the present form of the devices for plowing in conjunction with a tractor, the attention of the operator of the tractor must be diverted in at least two directions, namely, toward the operation and guiding of the tractor and toward the guiding and operation of the plow.

The present invention provides an attachment for a tractor whereby the operation of plowing is simplified, and whereby the plow may be drawn out of the ground when making a turn or in other circumstances where it is desirable to quickly and easily withdraw the plow from the ground. It is possible to withdraw the plow from the ground without in any way disturbing the operation of the tractor, and this is an advantage particularly when making turns and when working in rough ground.

These and other objects of the invention, its nature, its composition and arrangement and combination of parts will be readily understood by any one acquainted with the art to which this invention relates by consulting the following descriptions of the drawings, in which:—

Figure 2 is a top plan view partially in cross section showing the arrangement and construction of my improved tractor plow attachment.

Figure 3 is a detailed transverse cross sectional view approximately on the line 3—3 of Figure 1.

Figure 1:
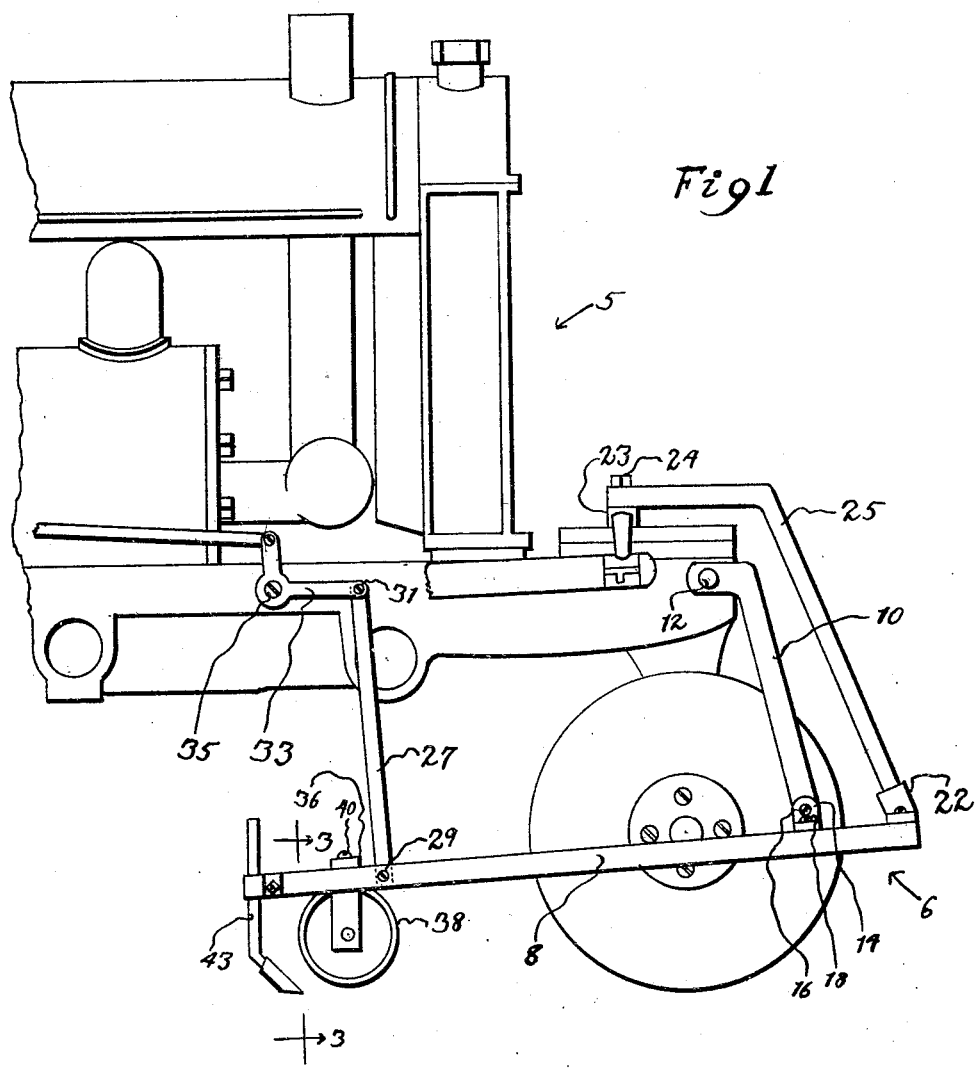
Figure 1 is a general side elevational view of a tractor showing attached thereto my improved plow attachment.
Figure 4:
Figure 4 is a transverse vertical cross sectional view through the socket member of the plow frame.

Referring in detail to the drawings, the numeral 5 designates generally a conventional form of tractor and the numeral 6 designates generally the frame of the plowing attachment which comprises a pair of horizontal side beams 7 and 8, respectively, which are carried by a pair of depending brackets 9 and 10 and secured rigidly at 11 and 12 on the center of the tractor frame. The numerals 13 and 14 denote an angle bracket which is secured on the upper side of the forward end portion of the side beams 7 and 8. The numerals 15 and 16 denote pivots mounted through the lower end of the brackets 9 and 10 whereby the beams 7 and 8 are pivotally and rockably mounted to said brackets 9 and 10. The numerals 17 and 18 refer to vertical pivots which permit horizontal lateral swinging movement of the frame with respect to the brackets 9 and 10. The front ends of the beams 7 and 8 are connected by a spar 19 which is pivotally mounted at 20 and 21 thereto. In the center of the upper side of the spar 19 there is a socket 22. On the steering pin 23 and on the forward part of the frame of the tractor 5 is secured by suitable means 24 an outwardly and downwardly projecting bar 25 which is adapted to have its lower end projected into said socket 22 when the frame of the attachment is in axial alignment with the tractor and the plows are in ground engaging position. This co-ordination of parts will be more fully explained hereinafter. Swingably supporting the rear end portion of the frame 6 is a pair of pivotally connected links 26, 27 pivotally connected at 28, 29. The upper ends of the links are pivotally connected as at 30, 31 to one arm of a bell crank 32, 33 which is pivoted at 34, 35 to the side of the tractor frame. The other arm of the bell crank is pivotally connected with an operating cable or lever. To the rear of the connection 29 is an adjustable cross bar 36 which has mounted on its underside a pair of ground engaging wheels 37, 38, and the cross bar 36 is pivotally mounted as at 39, 40 to the upper side of the side beams 7 and 8. The rear end portion of the side beams 7 and 8 are bent to form a closed loop clamp 41, 42 on each rear end thereof whereby to support suitable ground engaging tools or cutters 43.

Reference to Figure 3 will more clearly disclose the fixed attachment of the wheels 43. An angle bracket 44 is secured by a plurality of bolts or screws 45 to the underside of the cross beam or bar 36, and the dependent portion of the angle bracket carries a stub-axle 46 on which the wheel 43 is carried.

Normally the depending bar 25 is disposed in the socket 22 so that the plowing is accomplished in a straight ahead manner deviating only with the slight deviation of the tractor in its travel. However, when it is desired to withdraw the plow knives 43 from the ground the bell crank 33 is actuated by means of a lever or other suitable means so that the plows are drawn out of the ground by rocking upon the pivots 15 and 16 on the lower ends of the bars 9 and 10. Should this swinging movement be upwardly as respects the rear portions of the beams 7 and 8, it will be seen that the socket 22 will be drawn from the bar 25 and the frame will then be free to swing laterally to accommodate various situations met with in plowing, such as turning, or in the case of irregularities in the ground.

The advantages and novelty of my invention will be readily appreciated by any one acquainted with the art to which this invention relates and it is, therefore, deemed to have been sufficiently described above so as not to require further elucidation in detail.

It is to be definitely understood that I do not desire to limit the application of my invention to the particular modification set out herein to illustrate the principles thereof, and any change or changes may be made in material and structure consistent with the spirit and scope of the invention.

What is claimed is:—

1. A plow attachment for a tractor consisting of a frame comprising a front cross bar, a pair of laterally and vertically swingable side beams, a depending bracket on each side of the forward part of the traction frame forming a fulcrum for the said side beams, a vertical link pivotally connected to the rear portion of each side beam, a bell crank pivoted on each side of the tractor frame and carrying on one arm thereof said vertical link, the remaining arm of said bell crank adapted to be connected with an actuating means for swinging the same, a socket on the middle portion of the front cross bar, a downwardly projected rod rigidly secured at its upper end to turn with the steering pin of the tractor and adapted to have its lower end removably positioned in said socket, a cross member and ground engaging wheels on the rear end portions of the side beams, and plow knives removably secured on the rear extremities of the side beams.

2. A plow attachment for a tractor consisting of a frame comprising a front cross bar, a pair of laterally and vertically swingable side beams, a depending bracket on each side of the forward part of the traction frame forming a fulcrum for the said side beams, a vertical link pivotally connected to the rear portion of each side beam, a bell crank pivoted on each side of the tractor frame and carrying on one arm thereof said vertical link, the remaining arm of said bell crank adapted to be connected with an actuating means for swinging the same, a socket on the middle portion of the front cross bar, a downwardly projected rod rigidly secured at its upper end to turn with the steering pin of the tractor and adapted to have its lower end removably positioned in said socket, a cross member and ground engaging wheels on the rear end portions of the side beams, and plow knives removably secured on the rear extremities of the side beams, said ground engaging wheels having brackets mounted to the underside of and within the ends of said cross member, said cross member being pivotally mounted to said side beams.

3. A plow attachment for a tractor consisting of a frame comprising a front cross bar, a pair of laterally and vertically swingable side beams, a depending bracket on each side of the forward part of the traction frame forming a fulcrum for the said side beams, a vertical link pivotally connected to the rear portion of each side beam, a bell crank pivoted on each side of the tractor frame and carrying on one arm thereof said vertical link, the remaining arm of said bell crank adapted to be connected with an actuating means for swinging the same, a socket on the middle portion of the front cross bar, a downwardly projected rod rigidly secured at its upper end to turn with the steering pin of the tractor and adapted to have its lower end removably positioned in said socket, a cross member and ground engaging wheels on the rear end portions of the side beams, and plow knives removably secured on the rear extremities of the side beams; said actuating means comprising a connection and a lever arranged to draw the plow knives out of the ground.

In testimony whereof I affix my signature.

JOSEPH THOMAS WOOD.